United States Patent
Andreozzi et al.

(10) Patent No.: US 11,455,268 B2
(45) Date of Patent: Sep. 27, 2022

(54) METHOD, SYSTEM AND DEVICE FOR ELECTRONIC INTERCONNECT DELAY BOUND DETERMINATION

(71) Applicant: Arm Limited, Cambridge (GB)

(72) Inventors: Matteo Maria Andreozzi, Cambridge (GB); Michael Andrew Campbell, Waterbeach (GB); Giovanni Stea, Cascina (IT); Raffaele Zippo, Caserta (IT)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/790,112

(22) Filed: Feb. 13, 2020

(65) Prior Publication Data
US 2021/0255981 A1 Aug. 19, 2021

(51) Int. Cl.
*G06F 13/40* (2006.01)
*G06F 9/48* (2006.01)

(52) U.S. Cl.
CPC ........ *G06F 13/4027* (2013.01); *G06F 9/4881* (2013.01); *G06F 13/4022* (2013.01)

(58) Field of Classification Search
CPC . G06F 9/4881; G06F 13/4022; G06F 13/4027
See application file for complete search history.

(56) References Cited

U.S. PATENT DOCUMENTS

| | | | | |
|---|---|---|---|---|
| 6,370,145 | B1* | 4/2002 | Dally | H04L 69/16 370/409 |
| 2002/0112097 | A1* | 8/2002 | Milovanovic | G06F 9/5088 719/331 |
| 2003/0169756 | A1* | 9/2003 | Scholten | H04L 12/4604 370/412 |
| 2013/0028083 | A1* | 1/2013 | Yoshida | H04L 49/60 370/230 |
| 2013/0142066 | A1* | 6/2013 | Yamaguchi | H04L 47/70 370/252 |
| 2014/0156929 | A1* | 6/2014 | Falsafi | G06F 12/0811 711/122 |
| 2019/0260504 | A1* | 8/2019 | Philip | H04L 1/0045 |
| 2019/0306062 | A1* | 10/2019 | Foo | H04L 47/283 |

OTHER PUBLICATIONS

Qian, Yui, et al., "Analysis of Worst-case Delay Bounds for Best-effort Communication in Wormhole Networks on Chip", School of Computer Science, National University of Defense Technology, China, Dept. of Electronic, Computer and Software Systems, Royal Institute of Technology (KTH), Sweden, IEEE 2009, 10 pages.*
Qian, Yui, et al.,"Analysis of Communication Delay Bounds for Network on Chips", School of Computer Science, National University of Defense Technology, China, Dept. of Electronic, Computer and Software Systems, Royal Institute of Technology, Sweden, IEEE 2009, 6 pages.

(Continued)

*Primary Examiner* — Eric T Oberly
(74) *Attorney, Agent, or Firm* — Berkeley Law & Technology Group, LLP

(57) ABSTRACT

The present disclosure relates generally to electronic interconnects including one or more switches and, more particularly, to delay bound determination for electronic interconnects.

18 Claims, 18 Drawing Sheets

(56) References Cited

OTHER PUBLICATIONS

Lu, Zhonghai, et al., "Feasibility Analysis of Messages for On-chip Networks Using Wormhole Routing", Royal Institute of Technology, Stockholm, 16440 Kista, Sweden, Proceedings of the ASP-DAC 2005. Asia and South Pacific Design Automation Conference, IEEE 2005, 5 pages.

Bjerregaard, Tobias, et al., "A Survey of Research and Practices of Network-on-Chip", Technical University of Denmark, ACM Computing Surveys, vol. 38, Mar. 2006, 51 pages.

\* cited by examiner

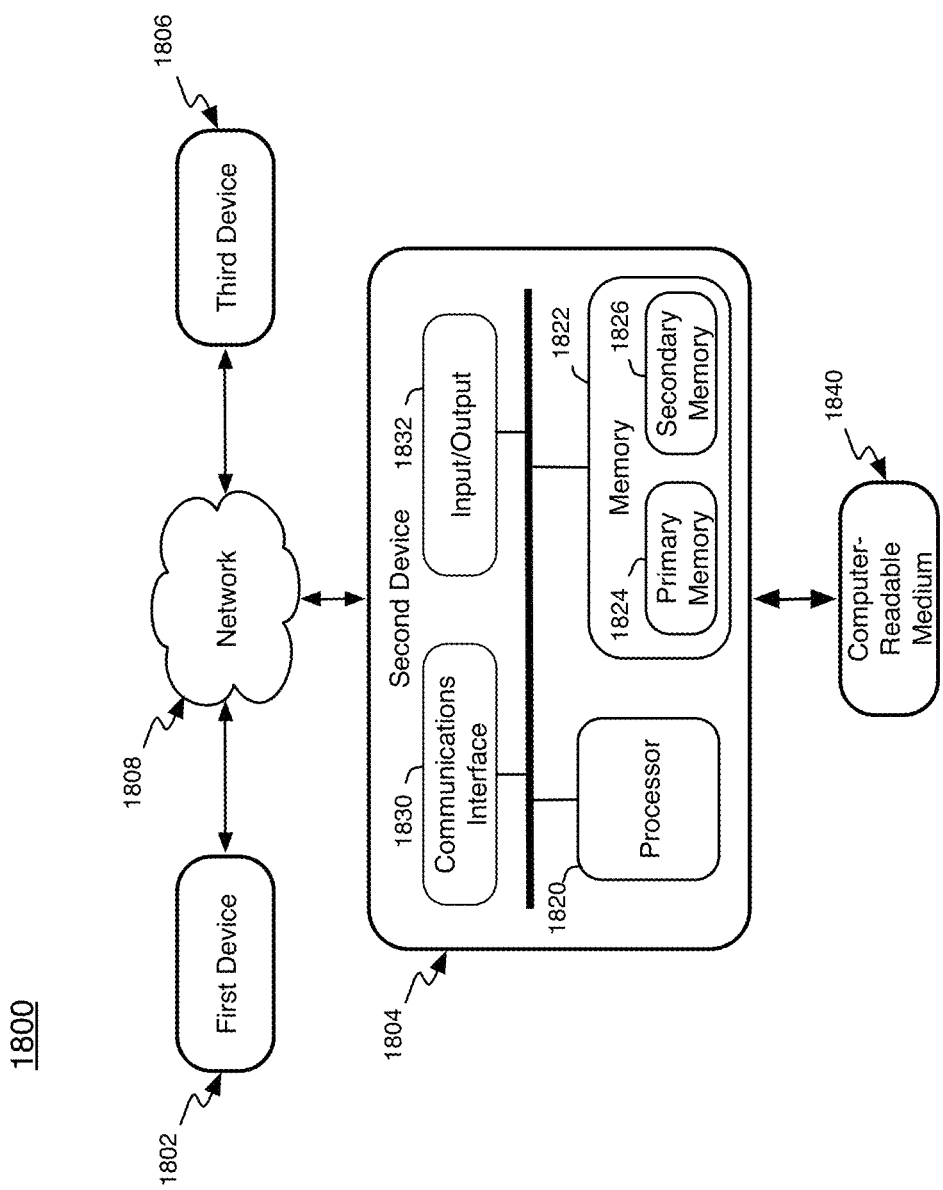

METHOD, SYSTEM AND DEVICE FOR ELECTRONIC INTERCONNECT DELAY BOUND DETERMINATION

BACKGROUND

Field

The present disclosure relates generally to electronic interconnects including one or more switches and, more particularly, to delay bound determination for electronic interconnects.

Information

As integrated circuit (IC) technologies evolve, greater amounts of functionality may be incorporated on a single device. Modern ICs may incorporate multiple functions and/or processors on a single integrated circuit. Some electronic devices, such as system-on-a-chip (SoC) devices implemented as single die integrated circuits (ICs), may include various processing circuitry, interface circuitry, specialized function circuitry and so forth. Some electronic devices may implement electronic interconnects by which various circuitry may communicate with each other. Further, in some electronic devices, electronic interconnects may be implemented as a network including, for example, one or more routers and/or switches to facilitate communication among various circuitry. In some circumstances, implementing electronic interconnects may pose challenges related to, for example, routing latencies, congestion, quality of service, etc.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 18 is a schematic diagram illustrating an embodiment of an example computing device.

Figure 1:
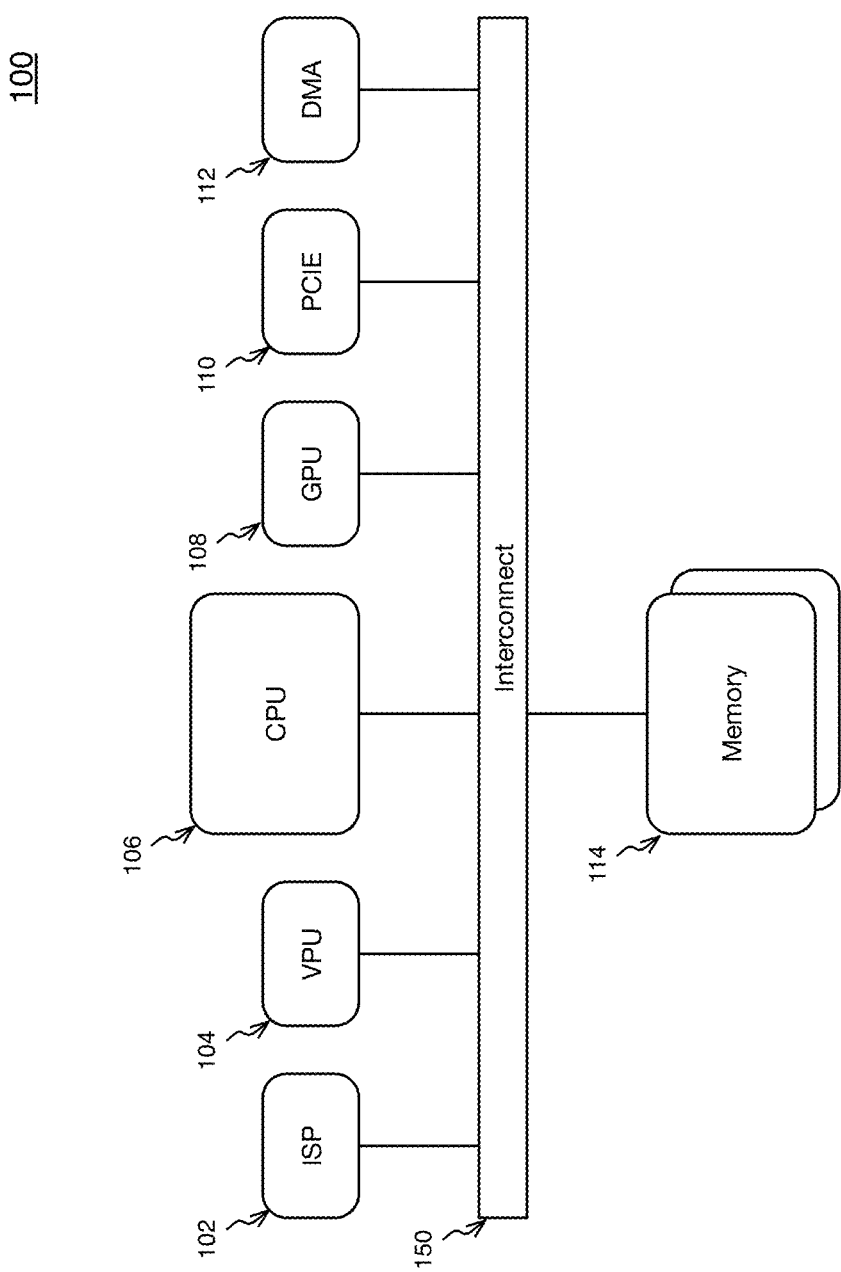
FIG. 1 is a schematic block diagram depicting an embodiment of a system including an example interconnect to facilitate communication among a plurality of electronic circuits.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned above, modern integrated circuits (ICs) may incorporate multiple functions and/or processors on a single device. Some electronic devices, such as system-on-a-chip (SoC) devices implemented as single die integrated circuits (ICs), may include various processing circuitry, interface circuitry, specialized function circuitry and so forth. Some electronic devices may implement electronic interconnects by which various circuitry may communicate with each other. Further, in some electronic devices, electronic interconnects may be implemented as a network including, for example, one or more routers and/or switches to facilitate communication among various circuitry. In some circumstances, implementing electronic interconnects may pose challenges related to, for example, routing latencies, congestion, quality of service, etc.

FIG. 1 is a schematic block diagram depicting an embodiment 100 of a system including an interconnect 150 to facilitate communication between and/or among a plurality of electronic circuits. In an implementation, system 100 may include a central processing unit (CPU) 106, an image signal processor (ISP) 102, a video processing unit (VPU) 104, a graphics processing unit (GPU) 108, a peripheral component interconnect express (PCIE) controller 110, a direct memory access (DMA) controller 112 and/or one or more memory units 114. In an implementation, interconnect 150 may facilitate communication between and/or among the various electronic circuits of system 100. Further, in an implementation, system 100 may be implemented as a system-on-a-chip (SOC), whereby the various electronic circuits of system 100 are implemented on a single integrated circuit die. Of course, system 100 is merely an example system, and claimed subject matter is not limited in scope in this respect. For example, other systems in accordance with claimed subject matter may include other types and/or configurations of electronic circuits. Further, in an implementation, system 100 may be implemented in more than one integrated circuit die.

Figure 3:
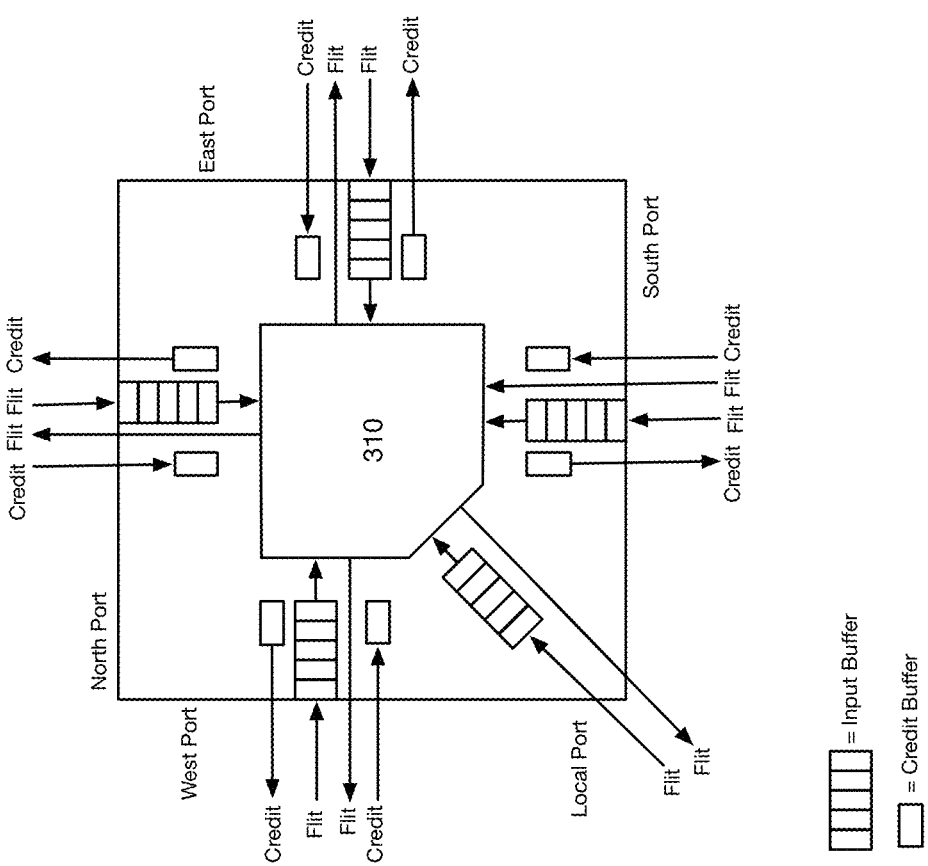
FIG. 3 is a schematic block diagram depicting an embodiment of a switch for an electronic interconnect.

In an implementation, an electronic interconnect, such as interconnect 150, may include one or more routers and/or switches. As utilized herein, "switch," "router" and/or the like, which may be utilized herein interchangeably, refer to a circuit and/or device that may receive and/or transmit signal packets and/or flits to facilitate communication among multiple processors, functional units, circuits, etc. For example, a switch may receive a signal packet or flit from a particular electronic circuit and may direct the signal packet or flit to an appropriate destination circuit. In an implementation, an electronic interconnect, such as interconnect 150, may include one or more switches to facilitate communication (e.g., via signal packets and/or flits) between and/or among various electronic circuits, such as CPU 106, ISP 102, VPU 104, GPU 108, PCIE controller 110, DMA controller 112 and/or memory units 114. An embodiment 300 of an example switch, depicted in FIG. 3, is described more fully below. Although examples herein may described in reference to switches, claimed subject matter is not limited in scope in this respect. Rather, as utilized herein, "switch" is meant to encompass other circuit and/or device types (e.g., routers) that receive and/or transmit signals packets and/or flits to facilitate communication among multiple electronic circuits.

Figure 2:
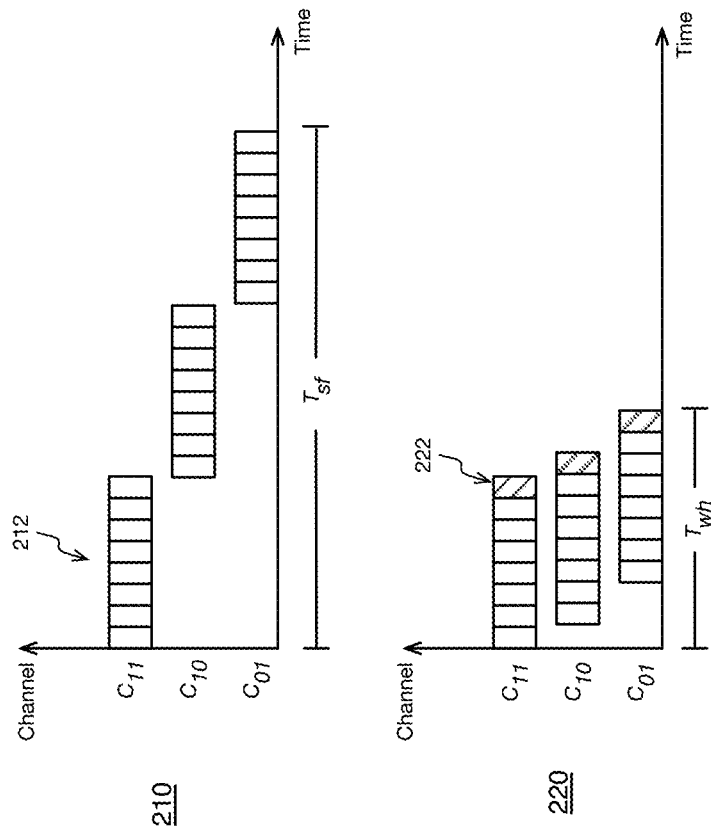
FIG. 2 is an illustration depicting example signal packet and/or flit communication types, in accordance with an embodiment.

FIG. 2 is an illustration depicting example signal packet and/or flit communication types, in accordance with an embodiment. For example communication 210, a signal packet 212 may be communicated (e.g., via communication channel $c_{11}$) to an input buffer of a first switch (not depicted). In some circumstances, signal packet 212 may be scanned to determine an appropriate communication channel (e.g., channel $c_{10}$) through which the first switch may transmit signal packet 212 to a next destination (e.g., a second switch). In some circumstances, signal packet 212 may be moved to an output buffer in preparation for transmission to a next destination. As indicated, for example communication 210, signal packet 212 may be communicated between an output buffer of a first switch to an input buffer of a second switch via communication channel $c_{10}$. Similarly, signal packet 212 may eventually be communicated between a second switch and a subsequent destination via communication channel $c_{01}$, for example.

In some circumstances, example communication 210 may represent a "store and forward" approach to signal packet communication. Such an approach may lead to particular challenges if implemented, for example, in a network-on-a-chip-type system and/or device, such as example system 100. For example, a store and forward approach may utilize switches that incorporate multiple buffers (e.g., input and output buffers for respective communication ports) that may be sized to store at least one signal packet. Also, for example, a store and forward approach may result in signal packets being delayed at individual switches due at least in part to signal packets being received completely in an input buffer before being moved to an output buffer for transmission to a next destination. Thus, a store-and-forward-type approach may result in relatively higher latencies and/or relatively lower throughput, for example. Further, due at least in part to store-and-forward-type switches incorporating input and output buffers to store complete signal packets, a relatively greater amount of integrated circuit die area may be devoted to buffer implementation.

Example communication 220 represents a wormhole-type approach to signal packet communication according to an embodiment. For a wormhole-type approach, signal packets may be partitioned into smaller units of uniform size referred to as "flits." In an implementation, a signal packet may comprise at least a header portion and a payload portion, although claimed subject matter is not limited in scope in this respect. Also, in an implementation, header and/or payload portions of a signal packet may be partitioned into one or more flits. A "header" flit may comprise a first flit overall of a particular signal packet and/or may include at least a chunk of a header portion of a particular signal packet. For example, a header flit may include one or more signals and/or states indicative of a destination for a particular communication such that a switch, such as switch 300, may determine an appropriate output port for a particular signal packet, for example. In an implementation, signal packets may be substantially compliant and/or compatible with an Advanced Microcontroller Bus Architecture (AMBA) protocol specification published by Arm Limited (e.g., AMBA 5 CHI Issue D, August 2019), although claimed subject matter is not limited in scope in this respect.

An example flit 222 comprising a portion of a larger signal packet is depicted in example communication 220. In an implementation, flits may be transmitted independently. For example, flit 222 may be received at a first switch via communication channel $c_{11}$ and may be transmitted to a next destination via communication channel $c_{10}$ before the remainder of a larger signal packet is received at the first switch. Further, in an implementation utilizing a wormhole-type approach, individual flits of a particular signal packet may be stored in different buffers of different switches concurrently. Thus, for example, a particular flit may reside in an input buffer of a second switch while another flit of the same signal packet may still reside in an input buffer of a first switch. As utilized herein, "wormhole," "wormhole routing," "wormhole-type approach" and/or the like refer to a type of communication such that signal packets are partitioned into smaller flits and such that individual flits of a particular signal packet may reside in different buffers and/or different switches concurrently. In particular implementations, wormhole-type switches may be adapted to hold relatively small portions of a signal packet. "Wormhole-type switch" and/or the like refers to a switch adapted to process flits, including forwarding flits to a second device and/or circuit (e.g., downstream switch) responsive to obtaining one or more signals and/or states from the second device and/or circuit indicating sufficient vacancy in an input buffer of the second device and/or circuit, as explained more fully below. In an implementation, wormhole-type switches may implement input buffers, but not output buffers, as also described more fully below. Also, because individual flits of a particular signal packet may reside at different switches concurrently, a wormhole-type switch input buffer size may be reduced as compared with buffer sizes for store-and-forward-type switches, resulting therefore in more efficient utilization of integrated circuit die area, for example.

Communication via wormhole-type switches may result in relatively shorter delays, reduced latencies and/or increased throughput, for example, as compared with a store-and-forward-type approach due, at least in part, to a capability of transmitting individual flits before other flits of a signal packet have been received at a particular switch. For example, as depicted in FIG. 2, example communication 220 may be accomplished via wormhole routing techniques within a relatively shorter period of time $T_{wh}$ and example communication 210 may be accomplished over a relatively longer period of time $T_{sf}$ using a store-and-forward approach.

FIG. 3 is a schematic block diagram depicting an embodiment 300 of an example switch, such as may be implemented in an electronic interconnect (e.g., interconnect 150). In an implementation, electronic interconnect 150 may include multiple switches, such as switch 300. In an implementation, switch 300 may comprise a number of ports, such as a west port, north port, east port and/or south port. Individual ports may include an input buffer and/or one or more credit buffers, for example. In an implementation, switch 300 may also include a local port that may provide electrical connectivity with a local processor (not depicted). Switching circuitry 310 may direct flits from an input buffer of a particular port to an appropriate output of a particular port, as discussed more fully below.

In an implementation, switch 300 may comprise a wormhole-type switch that may interconnect by way of one or more communication channels (e.g., electrically conductive signal lines) with other switches and/or with other electronic circuits. As depicted in FIG. 3, switch 300 may include buffers to store flits (e.g., one or more signal states) at port inputs. Output buffers are not provided, in an implementation. In an implementation, flits may be transmitted from an input buffer to an input buffer of a next switch. Further, in an implementation, flits may be processed in a first-in, first-out (FIFO) order. For example, a particular flit of a particular signal packet may not be processed until all flits that arrived previously at a particular switch have been processed.

In an implementation, a "credit" system may be implemented to arbitrate transmission resources. For example, for transmission of flits from a first switch to a second switch, the second switch (e.g., downstream switch) may communicate back to the first switch (e.g., upstream switch) one or more signals and/or states representative of an amount of vacancies in an input buffer of the second switch. Further, in an implementation, an upstream switch, such as the first switch for the current example, may transmit one or more flits to a downstream switch, such as the second switch in the current example, responsive to an indication from the upstream switch of sufficient vacancy in an input buffer of the downstream switch. Such communication may comprise transmission of a "credit" parameter from a downstream switch to an upstream switch, wherein the credit parameter comprises one or more signals and/or states representative of an amount of vacancy within a relevant input buffer of the downstream switch, for example. In an implementation, such credit parameters may be updated regularly to avoid incurrence of undue delay.

In an implementation, flits of a particular signal packet may be transmitted sequentially and/or may not be interleaved with other flits from the particular signal packet. Thus, for example, a signal packet traversing as flits through a particular switch may lock both an input link and an output link (e.g., flit input at a first port and flit output at a second port of a particular switch) until a last flit of the particular signal packet has been transmitted. In an implementation, other signal packets arriving at the same input port and/or designated for the same output port may be blocked while the input and output links are locked due to transmission of a previous signal packet. Further, in an implementation, arriving signal packets that do not share the same input port or the same output port may be transmitted through the particular switch concurrently with the previous signal packet.

As mentioned, a first overall flit of a particular signal packet may be referred to as a "header" flit. In an implementation, a header flit (e.g., comprising at least a chunk of a header portion of a particular signal packet) may arrive at an input buffer of a particular port of a particular switch. Further, in an implementation, responsive at least in part to the header flit moving to a head of a FIFO queue of an input buffer, the header flit may be processed to determine an appropriate output port for the particular signal packet. For the current example, source-routing with static routes may be assumed. In an implementation, a switch may wait until a determined output port is available. For example, as mentioned, an output port may not be available if another signal packet is currently traversing as flits through the output port from a different input. Further, in an implementation, for situations in which more than one header flit for more than one respective signal packets has arrived at a head of an input buffer of a particular switch and in which the more than one signal packets are requesting the same output port, an allocation approach may be utilized to determine which signal packet to transmit and which signal packet(s) to block. Additionally, responsive at least in part to a last flit of a particular signal packet being transmitted through a particular output port, the particular output port may become available for a subsequent allocation. Example transmission situations are described more fully below in connection with FIGS. 4-7.

Figure 4:
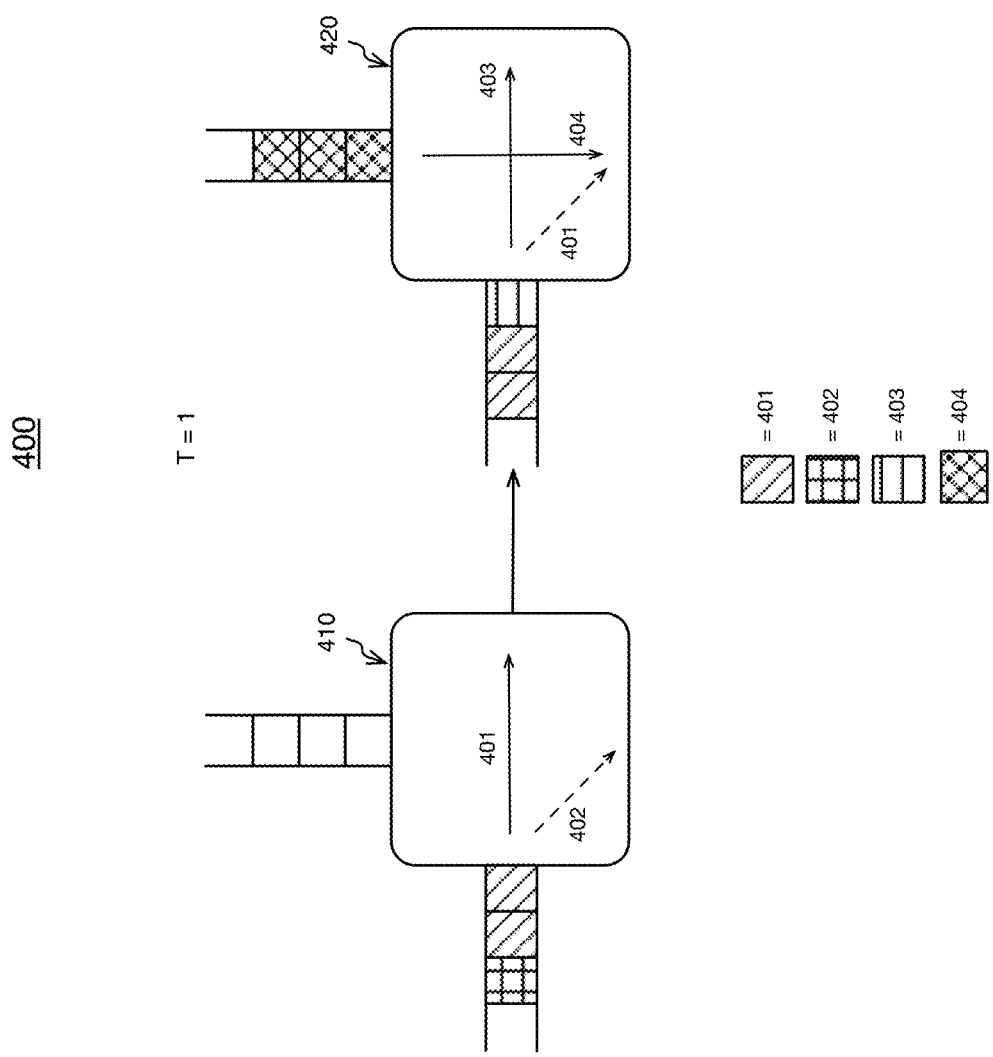
FIG. 4 is a schematic block diagram depicting an example transmission of example signal packets through one or more switches, in accordance with an embodiment.

FIG. 4 is a schematic block diagram depicting an example transmission 400 of example signal packets through one or more switches. For the example transmission discussed in connection with FIG. 4, as well as FIGS. 5-7, two switches 410 and 420 are described, wherein switches 410 and 420 include two input ports (e.g., north and west ports) and two output ports (e.g., south and east ports). However, claimed subject matter is not limited in scope in these respects. For example, implementations of electronic interconnects, such as interconnect 150, may include other amounts and/or configurations of switches. Further, individual switches may include other amounts and/or configurations of ports. For example transmission 400, signal packet 401 may traverse switch 410 and may further traverse switch 420. Further, for example transmission 400, signal packet 402 may traverse switch 410, signal packet 403 may traverse switch 420 and/or signal packet 404 may traverse switch 420. Example transmission 400 represents a first particular point in time for a particular electrical interconnect.

At the first particular point in time "T=1", signal packets 403 and 404 may traverse switch 420 concurrently. Because signal packets 403 and 404 utilize different input and output ports, both signal packets may be transmitted concurrently. However, at point in time T=1, signal packets 401 and 402 may be blocked due to a "head of line" blocking situation, wherein signal packets 401 and 402 may not be processed at least in part due to flits from a different signal packet residing ahead of signal packets 401 and 402 in their respective input buffers. For example, signal packet 401 may be blocked by signal packet 403, as signal packet 401 must wait for signal packet 403 to vacate an input buffer of a west port of switch 420. Also, for example, signal packet 402 may be indirectly blocked by signal packet 403 due to congestion at switch 420 propagating upstream to switch 410.

Figure 5:
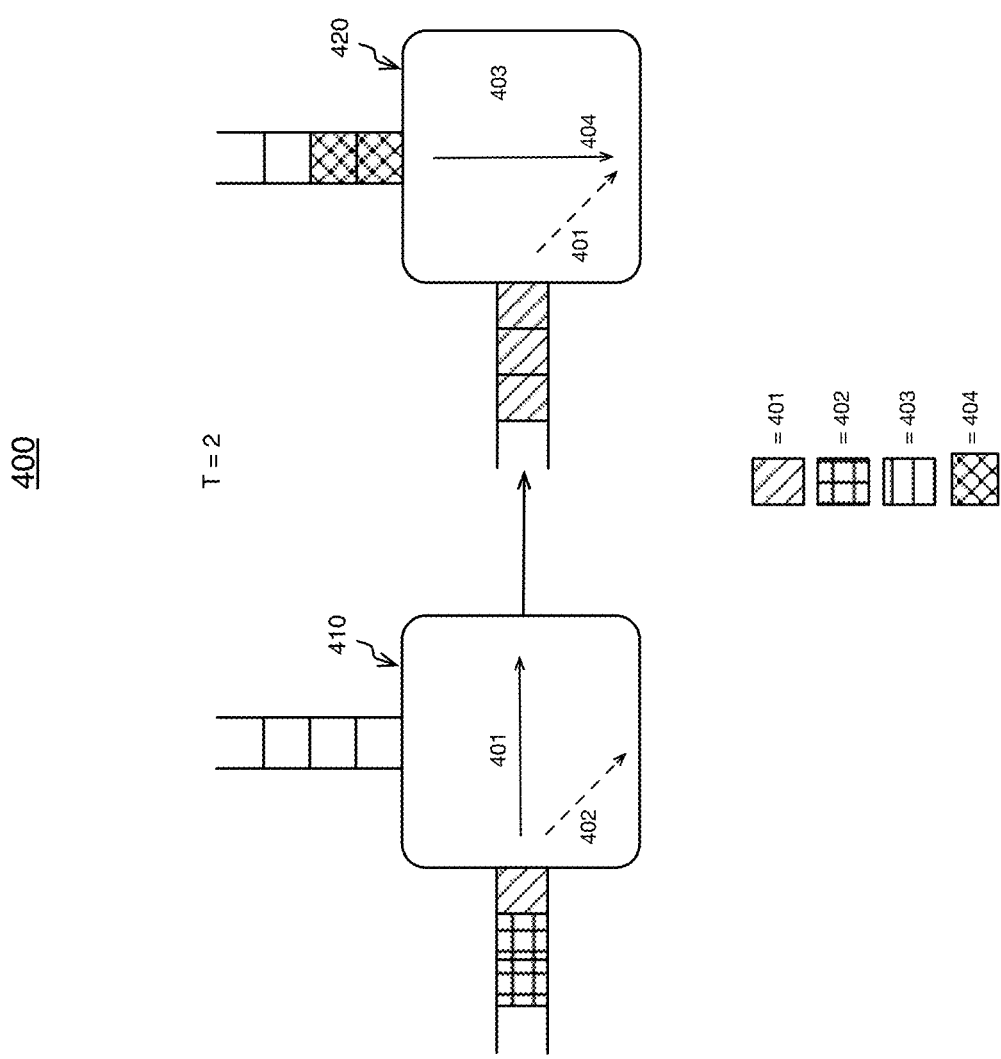
FIG. 5 is a schematic block diagram depicting an example transmission of example signal packets through one or more switches, in accordance with an embodiment.

FIG. 5 is a schematic block diagram depicting example transmission 400 at a particular point in time "T=2." At point in time T=2, as compared with point in time T=1, a flit for signal packet 403 has been transmitted from an output of an east port of switch 420 and a flit for signal packet 404 has been transmitted from an output of a south port of switch 420. For the current example, as signal packet 403 has completed transmission, a flit for signal packet 401 has advanced to the head of an input buffer of a west port of switch 420. At point in time T=2, signal packet 401 may be blocked by signal packet 404 due at least in part to being designated for the same output port (e.g., south port of switch 420). In an implementation, with no allocation decision being made, signal packet 404 may continue to be transmitted while signal packet 401 remains blocked.

Figure 6:
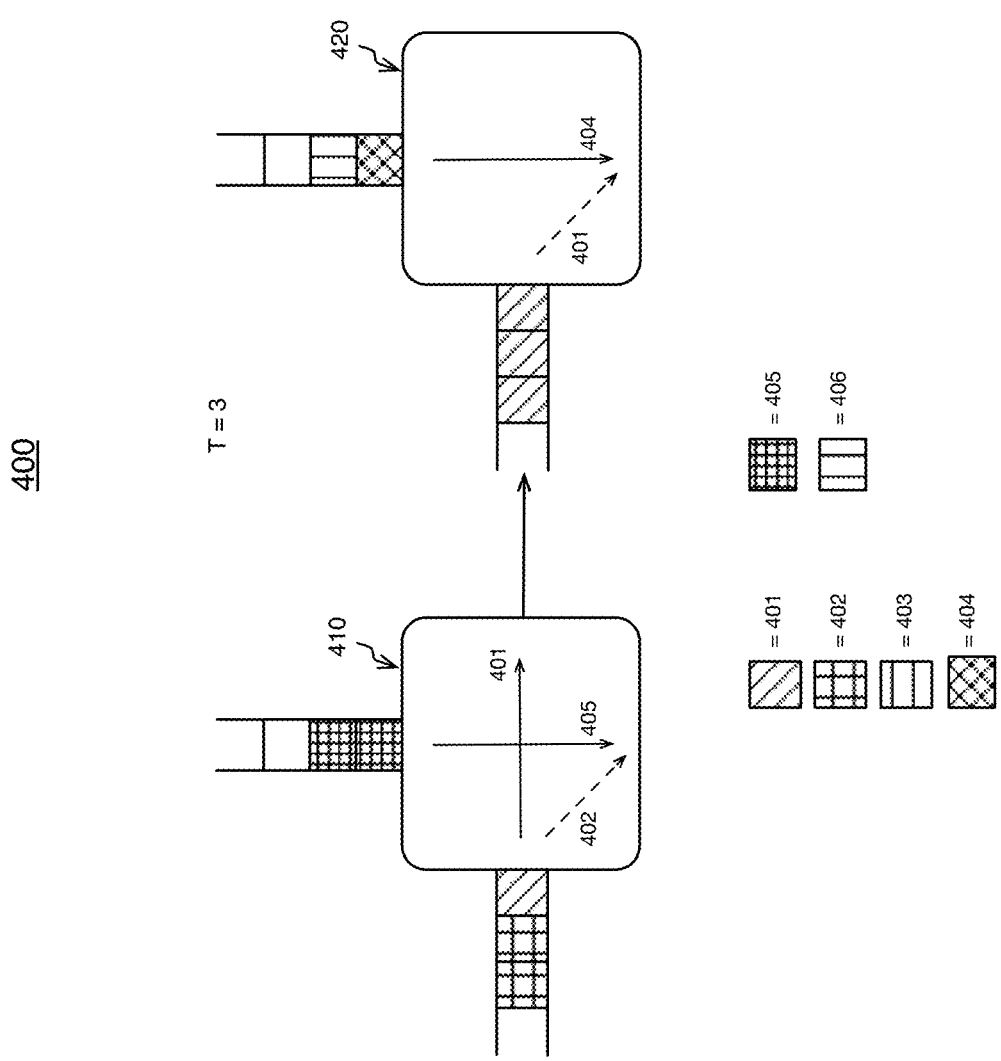
FIG. 6 is a schematic block diagram depicting an example transmission of example signal packets through one or more switches, in accordance with an embodiment.

FIG. 6 is a schematic block diagram depicting example transmission 400 at a particular point in time "T=3." At point in time T=3, as compared with point in time T=2, new signal packets 405 and 406 may arrive via north ports of switches 410 and 420, respectively. For signal packet 405, although signal packet 405 is designated for the same output port as previously-arrived signal packet 402, signal packet 405 may be transmitted immediately due, at least in part, to signal packet 402 remaining blocked behind signal packet 401, in an implementation. Also, at point in time T=3, signal packet 405 may be transmitted immediately due, at least in part, to a south port of switch 410 being currently unallocated and/or only one input port requesting connection to the south port. Thus, in an implementation, it may be possible for a later-arriving signal packet to bypass an earlier-arriving but blocked signal packet at least in some circumstances.

Figure 7:
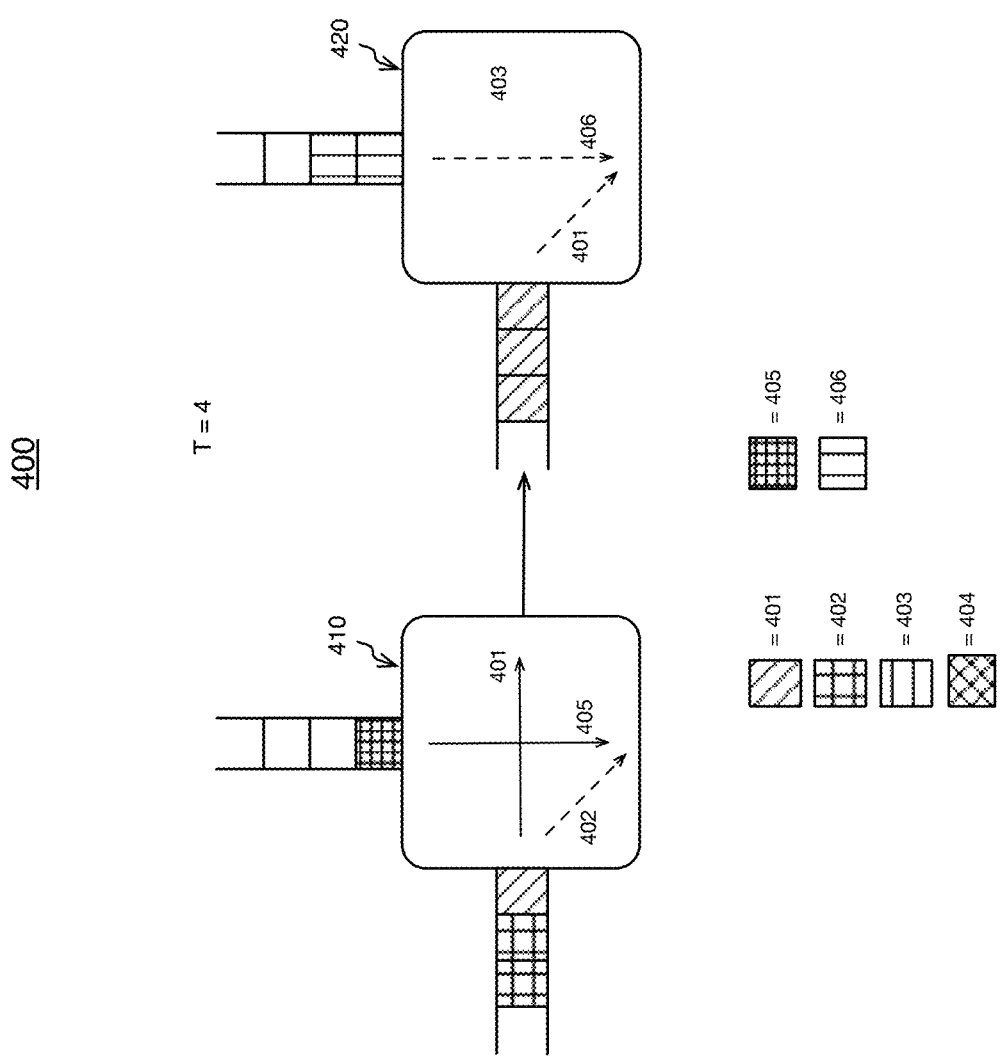
FIG. 7 is a schematic block diagram depicting an example transmission of example signal packets through one or more switches, in accordance with an embodiment.

FIG. 7 is a schematic block diagram depicting example transmission 400 at a particular point in time "T=4." At point in time T=4, as compared with point in time T=3, signal packet 404 has finished transmitting. At switch 420, for example, signal packets 401 and 406 are ready to be transmitted. However, because signal packets 401 and 406 are designated for the same output port (e.g., south port of switch 420), an allocation decision may be made to determine which signal packet to transmit and which to block. In implementations, any of a wide range of allocation approaches may be utilized, and claimed subject matter is not limited in scope in this respect.

In some circumstances, it may be advantageous to determine a worst-case delay parameter for particular communications between particular electronic circuits in a system, such as system 100. For example, a system designer may desire to implement a system-on-a-chip (SOC)-type device with specified quality of service (QOS) policies and/or parameters for particular applications. It may be beneficial for the system designer to be able to determine worst-case delay parameters for particular system and/or communications designs and/or architectures so that adjustments may be made to a design and/or architecture to ensure that specified QOS policies and/or parameters are met.

Further, an approach for determining a worst-case delay parameter for particular communications between and/or among various electronic circuits in a system, such as system 100, may be advantageously utilized by a scheduling agent (e.g., operating system, software application, etc.) to help ensure adherence to particular QOS parameters, for example. In an implementation, such an approach may be utilized in real-time by a scheduling agent to plan communications among various electronic circuits of system 100, for example.

Due at least in part to particular characteristics of wormhole-type interconnects and/or wormhole-type switches and/or or due at least in part to various transmission scenarios for wormhole-type switches, such as the non-limiting example situations described above, challenges may be faced in determining a delay bound parameter for a particular communication between electronic circuits. In some circumstances, delay bound parameters may be estimated via experimentation, such as by performing simulations for different system designs and/or for different communications scenarios. However, experimental approaches may only provide approximate and/or estimated delay bound parameters which may lead a system designer, for example, to over-design a system to help ensure adherence to specified QOS parameters and/or policies. An approach based on experimental results for estimating delay bound parameters may result in the design of less-efficient devices, for example. Efficiency of design may become increasingly important as more and more functionality is moved into mobile technologies with their increasing requirements for miniaturization and/or performance.

Figure 8:
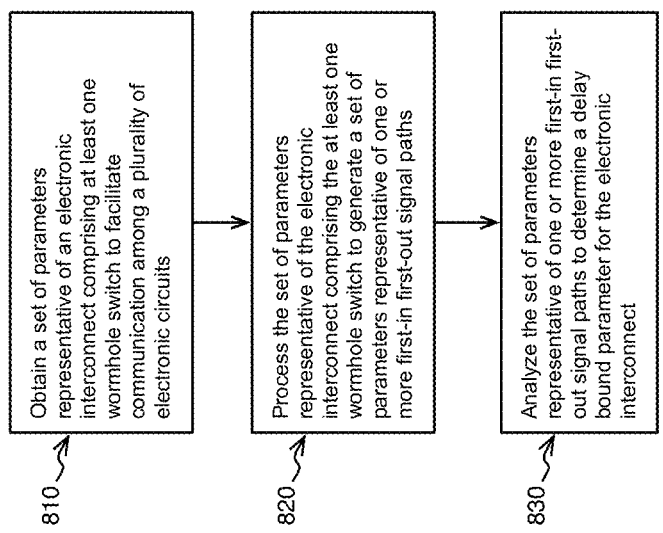
FIG. 8 is a flow diagram depicting an example process for determining a delay bound parameter for an electronic interconnect, in accordance with an embodiment.

To address issues such as those discussed above, embodiments may include determining delay bound parameters by analyzing performance guarantees for various aspects of particular systems. FIG. 8 is a flow diagram depicting an embodiment 800 of a process for determining a delay bound parameter for an electronic interconnect, such as interconnect 150. It should be noted that content acquired or produced, such as, for example, input signals, output signals, operations, results, etc. associated with example process 800 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

As mentioned, an electronic interconnect, such as interconnect 150, may comprise one or more wormhole-type switches, such as switch 300, in an implementation. Also, in an implementation, interconnect 150 may facilitate communication between and/or among a plurality of electronic circuits, such as, for example, CPU 106, ISP 102, VPU 104, GPU 108, PCIE controller 110, DMA controller 112 and/or memory units 114. For example process 800, a set of parameters representative of an electronic interconnect, such as interconnect 150, comprising at least one wormhole switch, such as switch 300, to facilitate communication between and/or among a plurality of electronic circuits may be obtained, as indicated, for example, at block 810. Further, as indicated at block 820, a set of parameters representative of an electronic interconnect comprising at least one wormhole switch may be processed to generate a set of parameters representative of one or more first-in first-out (FIFO) signal paths, as described more fully below. "FIFO" signal path and/or the like refers to a particular signal path (e.g., one or more particular input buffers, ports, links and/or the like) wherein signal packets and/or flits are transmitted from and/or traverse through the particular signal path in the order in which they are received at the particular signal path. Further, a "feed-forward" FIFO signal path refers to a FIFO signal path having no feedback (e.g., closed-loop) mechanism. For example, a feed-forward FIFO signal path may lack mechanism for reporting buffer vacancies to upstream devices and/or circuits (e.g., no credit system). As indicated at block 830, a set of parameters representative of one or more first-in first-out signal paths may be analyzed to determine a delay bound parameter for an electronic interconnect, as also described more fully below.

Figure 9:
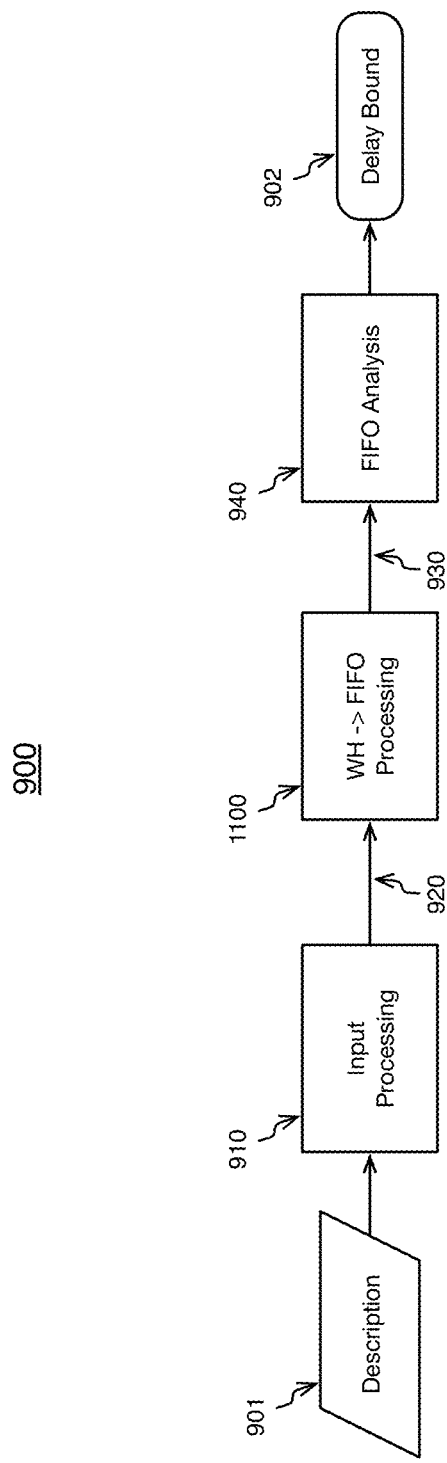
FIG. 9 is a flow diagram depicting an example process for determining a delay bound parameter for an electronic interconnect, in accordance with an embodiment.

FIG. 9 is a schematic block diagram depicting an embodiment 900 of an example approach for determining a delay bound parameter for an electronic interconnect, such as interconnect 150. It should be noted that content acquired or produced, such as, for example, input signals, output signals, operations, results, etc. associated with example approach 900 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

As indicated, an example process for determining a delay bound parameter for an electronic interconnect, such as interconnect 150, may include obtaining a set of parameters representative of an electronic interconnect including one or more wormhole switches. As depicted in FIG. 9, a set of parameters 920 representative of an electronic interconnect including one or more wormhole switches, such as switch 300, may be derived, at least in part, from signals and/or signal packets representative of a description 901 of an electronic interconnect, such as, and/or other electronic circuits, such as CPU 106, ISP 102, VPU 104, GPU 108, PCIE controller 110, DMA controller 112 and/or memory units 114. In an implementation, description 901 may comprise signals and/or signal packets representative of a textual description of an electronic interconnect and/or other electronic circuits. For example, description 901 may comprise a textual description of an electronic interconnect and/or other electronic circuits substantially compliant and/or compatible with a JavaScript Object Notation (JSON)-like specification and/or other suitable format.

Figure 13:
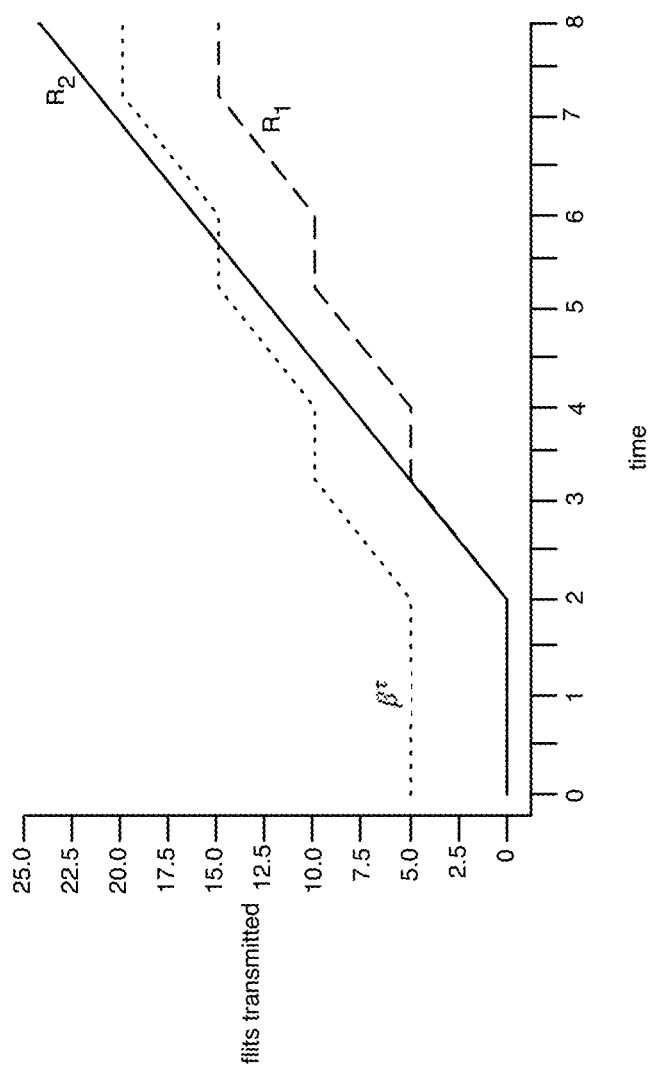
FIG. 13 is an illustration depicting a plot of example service curves for first and second switches and/or for a virtual flow controller, in accordance with an embodiment.

Further, as indicated at block 910, description 901 may be processed to generate a set of parameters 920 representative of an electronic interconnect, such as interconnect 150, including one or more wormhole switches, such as switch 300. In an implementation, parameters 920 may comprise parameters representative of one or more service curves for one or more wormhole switches and/or parameters representative of one or more resource sharing aspects of one or more wormhole switches. In an implementation, and as discussed more fully below, resource sharing characteristics of particular wormhole switches may include, for example, flow control sharing, link sharing and/or buffer sharing. As utilized herein, "service curve" and/or the like refers to one or more parameters (e.g., and array of signal samples) representative of amounts of signals and/or states, such as flits, moved through a particular resource-sharing point (e.g., buffer, switch, communication link and/or the like) over particular periods of time. In an implementation, a service curve may comprise a set of parameters representative of a worst-case output of a particular resource-sharing point (e.g., buffer, switch, communication link and/or the like) over time given an infinite burst of signal packets and/or flits. FIG. 13, described more fully below, provides several example service curves, although claimed subject matter is not limited in scope in these respects.

Based at least in part on a set of parameters 920 representative of one or more wormhole signal paths, including, for example, parameters representative of an electronic interconnect including one or more wormhole switches, such as switch 300, a set of parameters 930 representative of one or more FIFO signal paths may be generated, as indicated generally at block 1100. Example implementations with respect to processing a set of parameters 920 representative of one or more wormhole signal paths to generate a set of parameters 930 representative of one or more FIFO signal paths are discussed more fully below in connection with FIG. 11 and example process 1100. In general, by processing parameters representative of wormhole signal paths and/or switches to generate parameters representative of FIFO signal paths, analysis of a particular system, such as system 100, may be made more deterministic.

Figure 10:
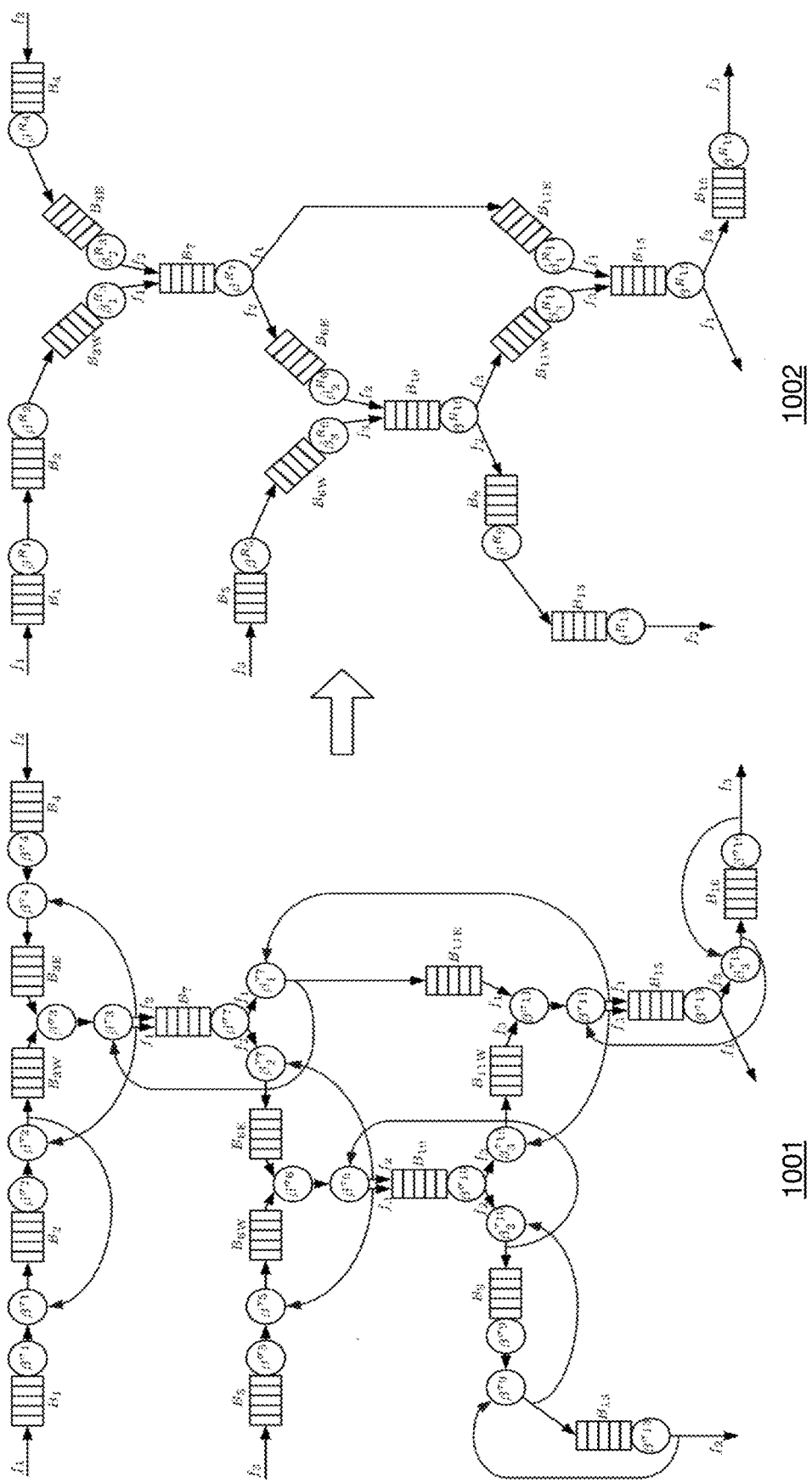
FIG. 10 is an illustration depicting example wormhole signal paths and example first-in, first-out signal paths.

For example, FIG. 10 is an illustration depicting multiple signal paths for an example wormhole network 1001, including depictions of input buffers and/or service curves corresponding to particular wormhole-type switches. It may be noted that example wormhole network 1001 includes a number of loops that may represent, at least in part, a credit system (e.g., communication of credit parameters from downstream switches to upstream switches, as previously mentioned). In some circumstances, the existence of loops within a representation of a wormhole system, including one or more wormhole switches, may complicate determination of delay bound parameters for particular communications. In an implementation, parameters representative of wormhole-type signal paths, such as depicted at example wormhole network 1001, may be converted into parameters representative of a feed-forward FIFO system, such as FIFO system 1002 depicted in FIG. 10. For example, as mentioned, a set of parameters 920 representative of one or more wormhole signal paths, including one or more wormhole switches, may be analyzed and/or otherwise suitably processed to generate a set of parameters 930 representative of one or more feed-forward FIFO signal paths.

Further, in an implementation, a set of parameters 930 representative of one or more FIFO signal paths may be analyzed to determine a delay bound parameter 902 as indicated at block 940. In an implementation, delay bound parameter 902 may represent a worst-case scenario for a particular communication between specified electronic circuits via a particular electronic interconnect, such as interconnect 150. As mentioned, it may be advantageous to determine a worst-case delay parameter for particular communications between particular electronic circuits in a system, such as system 100. For example, as mentioned, a system designer may desire to implement a system-on-a-chip (SOC)-type device with specified quality of service (QOS) policies and/or parameters for particular applications. Thus, it may be beneficial for the system designer to be able to determine worst-case delay parameters for particular system and/or communications designs and/or architectures so that adjustments may be made to a design and/or architecture to ensure that specified QOS policies and/or parameters are met. Additionally, as mentioned, determination of a worst-case delay parameter for particular communications between various electronic circuits in a system, such as system 100, may be advantageously utilized by a scheduling agent (e.g., operating system, software application, etc.) to help ensure adherence to particular QOS parameters, for example. In an implementation, delay bound parameter 902 may comprise a value representative of a total amount of time for a particular communication to traverse from a origination electrical circuit to a destination electrical circuit through one or more switches of an electrical interconnect, such as interconnect 150.

Figure 11:
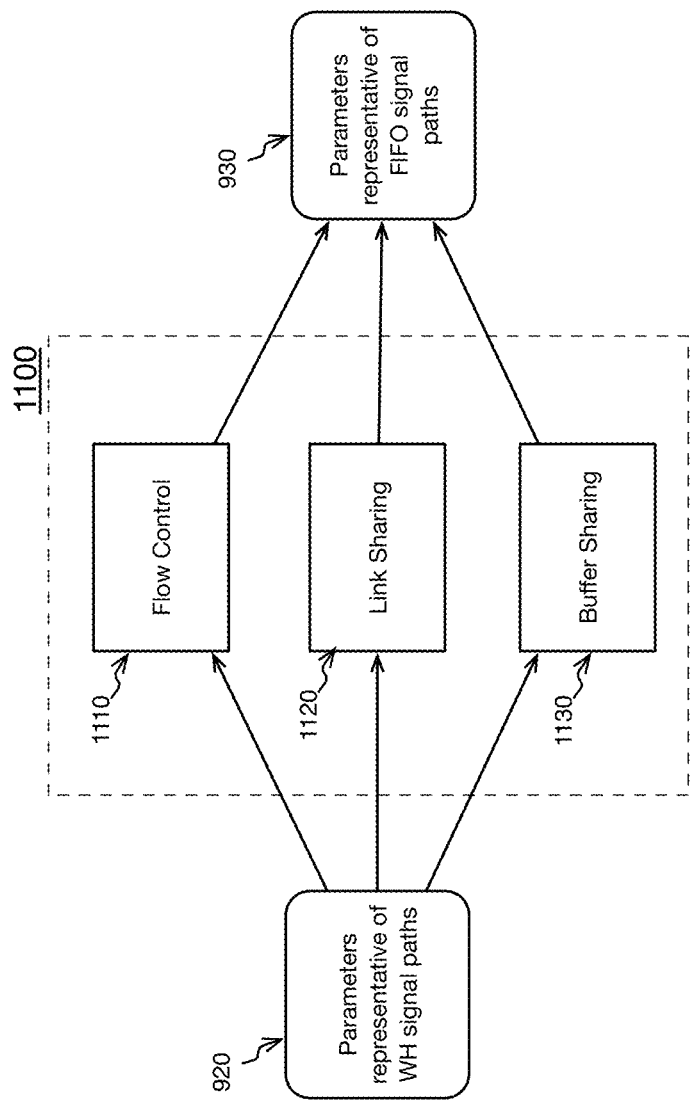
FIG. 11 is a flow diagram depicting an example process for determining a delay bound parameter for an electronic interconnect, in accordance with an embodiment.

FIG. 11 is a schematic block diagram depicting an embodiment 1100 of an example process for generating a set of parameters 930 representative of one or more FIFO signal paths based at least in part on a set of parameters 920 representative of one or more wormhole signal paths including one or more wormhole switches, such as switch 300. It should be noted that content acquired or produced, such as, for example, input signals, output signals, operations, results, etc. associated with example process 1100 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

As mentioned, parameters 920 may comprise parameters representative of one or more service curves for one or more wormhole switches, such as switch 300, and/or parameters representative of one or more resource sharing aspects of one or more wormhole switches. In an implementation, resource sharing characteristics of wormhole-type interconnects including one or more wormhole switches may include, for example, flow control sharing, link sharing and/or buffer sharing. As depicted in FIG. 11, example process 1100 may include an operation 1110 to convert and/or otherwise transform parameters representative of flow control sharing aspects of one or more wormhole-type signal paths to parameters representative of one or more feed-forward FIFO signal paths. Further, in an implementation, example process 1100 may include an operation 1120 to convert and/or otherwise transform parameters representative of link sharing aspects of one or more wormhole-type signal paths to parameters representative of one or more feed-forward FIFO signal paths and may also include an operation 1130 to convert and/or otherwise transform parameters representative of buffer sharing aspects of one or more wormhole-type signal paths to parameters representative of one or more feed-forward FIFO signal paths.

Figure 12:
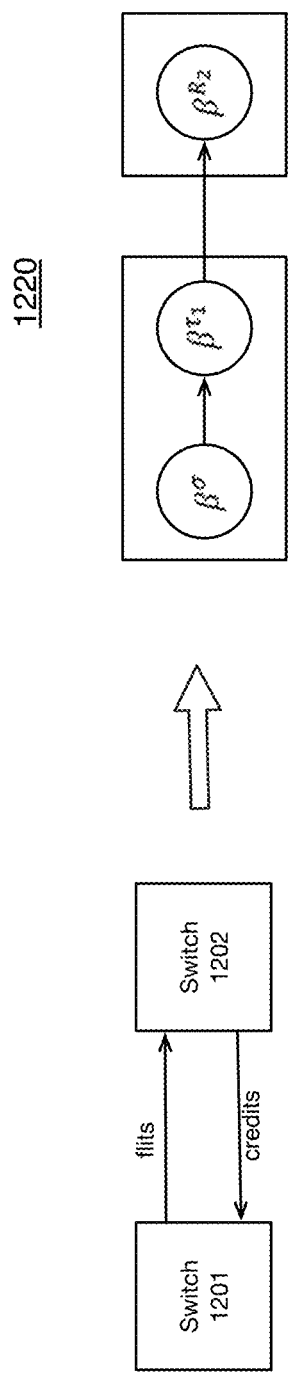
FIG. 12 is an illustration depicting an example virtual flow controller, in accordance with an embodiment.

Returning to operation 1110, wherein, in an implementation, parameters representative of flow control sharing aspects of one or more wormhole-type signal paths may be converted and/or otherwise transformed to parameters representative of one or more feed-forward FIFO signal paths. In connection with example operation 1110, FIG. 12 depicts a switch 1201 and a switch 1202, wherein switch 1201 transmits flits to switch 1202 and wherein switch 1202 transmits credit parameters to switch 1201. In an implementation, parameters representative of flow control sharing aspects of one or more wormhole-type signal paths may be converted and/or otherwise transformed to parameters representative of one or more feed-forward FIFO signal paths at least in part by modelling communications between switch 1201 and switch 1202 using a virtual flow controller device, such as virtual controller device 1220 depicted in FIG. 12. In an implementation, virtual flow controller device 1220 may incorporate an abstraction of a credit system to remove a credit system loop from subsequent analysis. For example, $\beta^o$ may represent a service curve for a switch in the absence of a credit system. In an implementation, service curves may be derived, at least in part, from hardware specifications for particular switches and/or other devices, for example. Further, $\beta^\tau$ may represent a service curve for a virtual flow controller, such as virtual flow controller 1220, for a particular communication link and $\beta^R$ may represent an equivalent service curve of a particular switch in the presence of a credit system, in accordance with example relation (1), below.

$$\beta^R = \beta^o \otimes \beta^\tau \qquad (1)$$

In an implementation, relation (1) may comprise one or more min-plus algebra operations that may be implemented in hardware, firmware and/or software. Similarly, other example relations, including relations expressed as one or more min-plus algebra operations, may be implemented in hardware, firmware and/or software.

In an implementation, $\beta^{\tau i}$ may represent a service curve for a virtual flow controller at least in part in accordance with example relation (2), below, wherein i represents a switch positioned at a transmitting end of a particular communication link, i+1 represents a switch positioned at a receiving end of the particular communication link, and $B_{i+1}$ represents a size of a buffer at the switch positioned at the receiving end of the link.

$$\beta^{\tau i} = \overline{\beta^{R_{i+1}} + B_{i+1}} \qquad (2)$$

To better explain example relation (2), consider an example situation involving two switches similar in at least some respects to example switch 300. For the present example, both switches may have a similar service curve $\beta^o$. Also, for the present example, the receiving switch, which may be referred to as $R_2$, may have no restrictions of service due to its output links. That is, for the receiving switch, an equivalent service curve may be represented as $\beta^{R2} = \beta^o$, for example.

Continuing with the present example, FIG. 13 is an illustration depicting a plot of example service curves for a transmitting switch $R_1$, a receiving switch $R_2$ and a virtual flow controller link $\beta^\tau$. For the present example, it may be observed $R_1$ that a service curve for transmitting switch $R_1$ may be limited by a service curve $\beta^\tau$ for the virtual flow controller. In an implementation, an input buffer provides service that may be limited by how fast a particular switch may empty the input buffer. Further, for the present example, selected buffer sizes and/or switch delay characteristics demonstrate that if a switch is slow to react to incoming flits the input buffer may be full before it starts to be emptied, thereby blocking further transmission for a period of time.

As mentioned, example process 1100 may include an operation 1120 to convert and/or otherwise transform parameters representative of link sharing aspects of one or more wormhole-type signal paths to parameters representative of one or more feed-forward FIFO signal paths. "Link sharing" and/or the like refers to effects of switching allocation on signal flows coming from different inputs and designating the same output port for a particular switch. In an implementation, a weighted round robin (WRR) approach may be utilized to represent link sharing aspects of particular switches, such as switch 300.

For an example WRR approach, $\beta_R$ may represent a service curve for a particular switch in case of a single flow of signal packets. Further, for an example WRR approach, i . . . n may represent incoming signal packet flows designating a particular output port and/or link, wherein individual flows may be assigned a weight parameter $\Phi_i$, wherein $$\Sigma\Phi_i = F \quad (3)$$

In an implementation, weights may be assigned to help ensure that signal packets may be delivered in their entirety in individual allocation periods so that flits of different signal packets don't interleave. For individual allocation periods, a switch, such as switch 300, may attempt to serve $\Phi_i$ flits before moving to a next buffer. Also, for an example WRR approach, C may represent a service rate for a particular switch, such as switch 300. Further, an equivalent service curve $\beta_i^R$ for signal packet flow i may be obtained at least in part by transforming $\beta_R$ at least in part by scaling its service rate by a relative weight of signal packet flow i and/or by introducing an additional worst-case delay in accordance with example relation (4), below.

$$\beta_i^R = \frac{\Phi_i}{F} \cdot \beta_R \otimes \delta_{\frac{F-\Phi_i}{C}} \quad (4)$$

Returning to operation 1130 of example process 1100, parameters representative of buffer aspects of one or more wormhole-type signal paths may be converted and/or otherwise transformed to parameters representative of one or more feed-forward FIFO signal paths. As utilized herein, "buffer sharing" refers to situations in which multiple different signal packet flows arrive at a same input port of a particular switch and are designated for different output ports. In an implementation, incoming signal packets may be serialized and/or may be ordered according to a FIFO order. Therefore, in some circumstances, one or more signal packet flows may be blocked even if their designated output ports are available. This situation may be referred to as "head of line" blocking, as mentioned previously. Due at least in part to different signal packet flows having different designated output ports, individual signal packet flows may experience varied service resulting, for example, from flow control and/or link sharing. Therefore, for a signal packet flow traversing an input port, a worst-case scenario may include a signal packet with the worst service positioned ahead of other signal packets.

For example, for a set of signal packet flows 1 . . . n with service curves $\beta_i^R$, an equivalent service curve for a switch from a perspective of an input port may comprise a minimum of the various service curves $\beta_i^R$, such as in accordance with example relation (5).

$$\beta_{\{1\ldots n\}}^R = \wedge \beta_i^R \quad (5)$$

In the discussion above, example processes and/or approaches for processing parameters representative of various aspects of a wormhole-type system, including one or more wormhole-type switches 300, to generate a set of parameters representative of one or more feed-forward FIFO signal paths have been presented. For example, example processes and/or approaches for processing parameters representative of flow control sharing, link sharing and/or buffer sharing aspects of one or more wormhole-type signal paths to generate parameters representative of one or more feed-forward FIFO signal paths are discussed above. It may prove advantageous to consider a particular switch analysis example in connection with operations to process sets of parameters representative of one or more wormhole-type signal paths, including, for example, one or more wormhole-type switches 300, to generate sets of parameters representative of one or more feed-forward FIFO signal paths.

Figure 14:
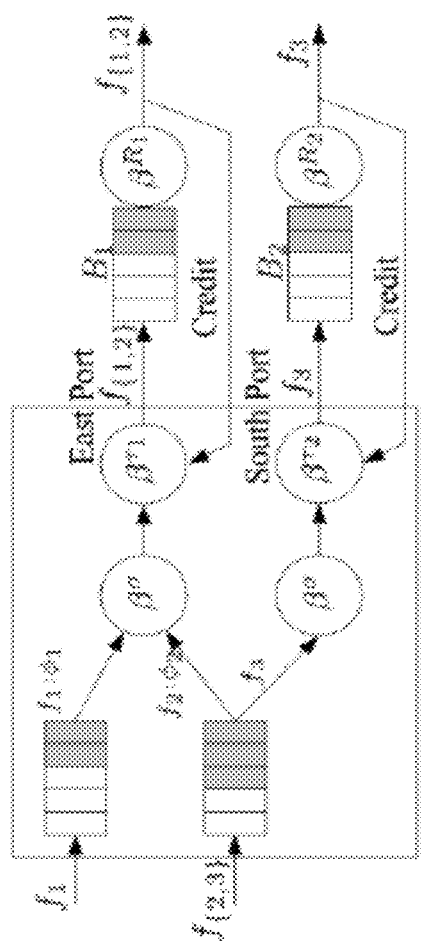
FIG. 14 is a schematic diagram depicting an example wormhole-type switch including multiple input and/or output signal packet flows, in accordance with an embodiment.
Figure 15:
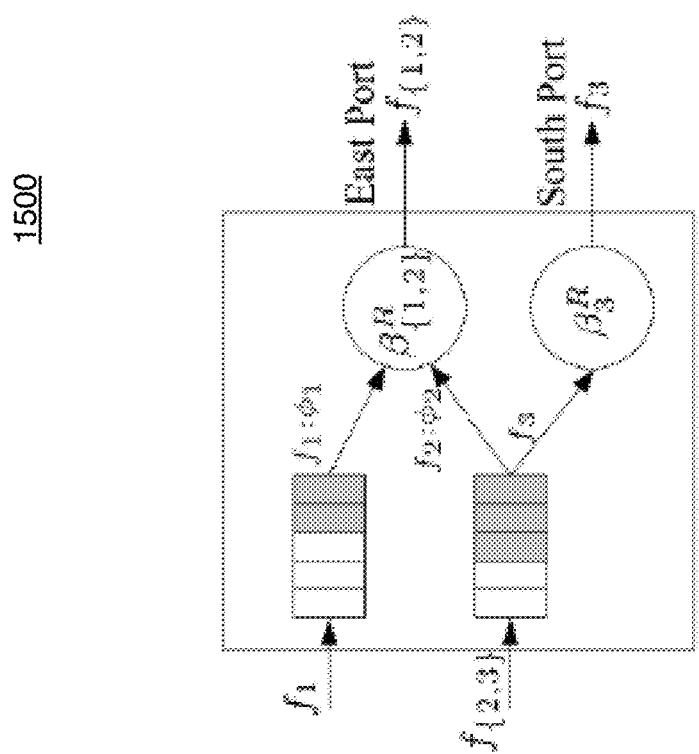
FIG. 15 is a schematic diagram depicting an example representation of a switch in a feed-forward configuration including multiple input and/or output signal packet flows, in accordance with an embodiment.

FIG. 14 is a schematic block diagram depicting a representation of an example wormhole-type switch, such as switch 300, including multiple input and/or output signal packet flows, in accordance with an embodiment. For example representation 1400, a representation of a wormhole-type switch, such as switch 300, is depicted with two inputs (e.g., north and west ports), two outputs (e.g., east and south ports), and three flows labeled $f_1$, $f_2$ and $f_3$. Also depicted in example representation 1400 are two input buffers (e.g., $B_1$ and $B_2$) from two respective next hops, which may comprise respective input ports of one or more downstream switches, for example. Credit system loops are also depicted between the next hops and the wormhole-type switch. For the present example, equivalent service curves (e.g., $\beta^{R1}$ and $\beta^{R2}$) for the next hops may be known. In an implementation, an operation to convert example representation 1400 to a feed-forward-type representation may be performed. For example, relation (2) may be applied, resulting in example representation 1500 depicted in FIG. 15. Following a transformation performed via application of example relation (2), it may be noted that the credit system loops have been eliminated, thereby transforming wormhole-type representation 1400 into feed-forward representation 1500. It may also be noted that for representation 1500 that the service curves for the two output ports are different as compared with representation 1400 resulting from application of example relation (2).

Figure 16:
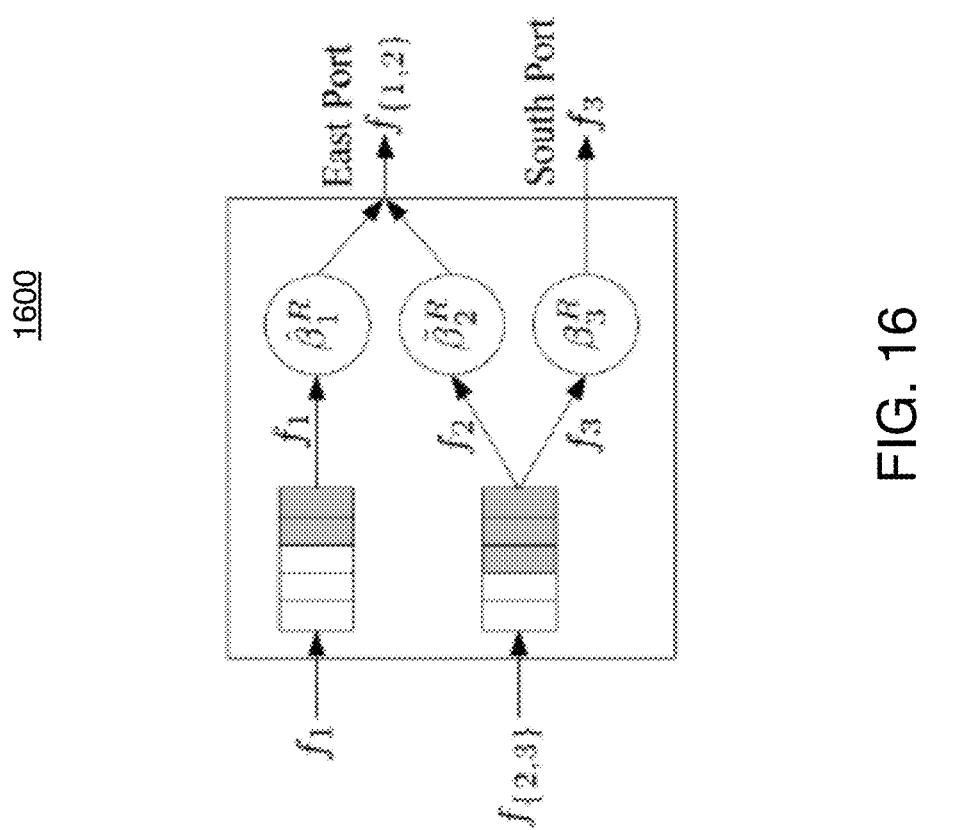
FIG. 16 is a schematic diagram depicting an example representation of a switch including multiple input and/or output signal packet flows and no link sharing, in accordance with an embodiment.

Additionally, continuing with the present example, it may be observed that two signal packet flows $f_1$ and $f_2$ are designated for the same output (e.g., east port). As mentioned, a WRR allocation policy may be implemented, for example, with weights $\Phi_1$ and $\Phi_2$. In an implementation, application of example relation (4) to representation 1500 may yield service curves $\beta_1^R$ and $\beta_2^R$, as depicted, for example, in example representation 1600 of FIG. 16.

Figure 17:
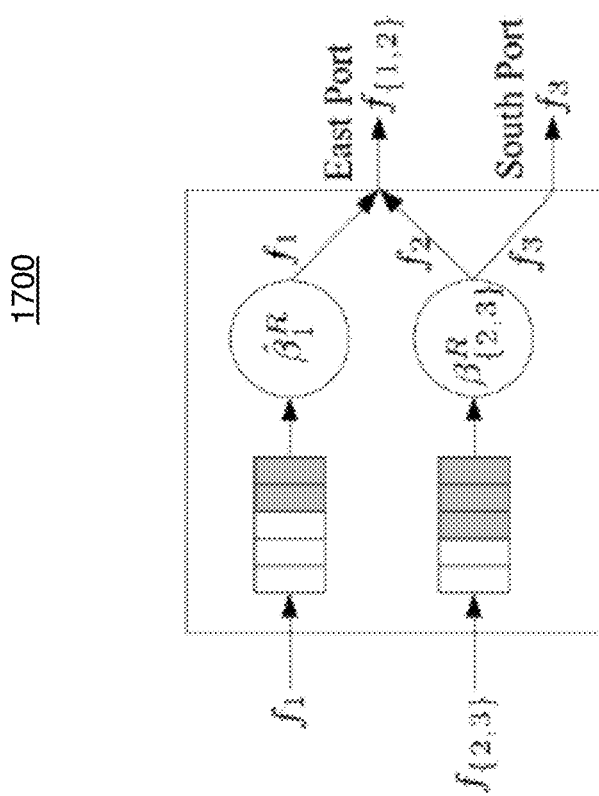
FIG. 17 is a schematic diagram depicting an example FIFO representation of a switch including multiple input and/or output signal packet flows, in accordance with an embodiment.

Observing example representation 1600, the bottom input is shared between flows $f_2$ and $f_3$. In an implementation, although flows $f_2$ and $f_3$ have different service curves for the present example, because they share the same input buffer a worst case scenario may be taken into consideration, such as via application of example relation (5). For the present example, application of relation (5) yields representation 1700 depicted in FIG. 17. In an implementation, example representation 1700 may comprise a feed-forward FIFO-type representation similar in at least some respects to example representation 1002 depicted in FIG. 10. Thus, via application of example relations (2), (4) and/or (5), in an implementation, a representation of a wormhole-type system, including one or more wormhole-type switches, may be processed to generate a representation of a feed-forward FIFO-type system. As previously mentioned, generation of parameters representative of feed-forward FIFO signal paths based on parameters representative of an electronic interconnect including one or more wormhole-type switches may allow for more deterministic calculations of delay bound parameters. As also mentioned, deterministic calculations of delay bound parameters may be utilized advantageously by system designers to ensure adherence with specified QOS policies and/or parameters, for example. Also, as previously mentioned, deterministic calculations of delay bound parameters may be advantageously utilized by a scheduling agent (e.g., operating system, software application, etc.) to help ensure adherence to particular QOS parameters, for example. In an implementation, any of a wide range of techniques and/or approaches for analyzing FIFO signal paths may be utilized to determine a delay bound parameter, and claimed subject matter is not limited in scope in this respect.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network.

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

In one example embodiment, as shown in FIG. 18, a system embodiment may comprise a local network (e.g., device 1804 and medium 1840) and/or another type of network, such as a computing and/or communications network. For purposes of illustration, therefore, FIG. 18 shows an embodiment 1800 of a system that may be employed to implement either type or both types of networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 18 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-17 and in the text associated at least with the foregoing figure(s) of the present patent application.

Referring now to FIG. 18, in an embodiment, first and third devices 1802 and 1806 may be capable of rendering a graphical user interface (GUI) for a network device and/or a computing device, for example, so that a user-operator may engage in system use. Device 1804 may potentially serve a similar function in this illustration. Likewise, in FIG. 18, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, sensor content, etc. in the form of signals and/or states. Thus, a computing device, in the context of the present patent application, may comprise hardware, software, firmware, or any combination thereof (other than software per se). Computing device 1804, as depicted in FIG. 18, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, endpoint and/or sensor nodes, gateway devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, sensor content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 18, computing device 1802 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 18 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 18, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 18 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
obtaining at a processor of a computing device a set of parameters representative of an electronic interconnect comprising at least a first switch to facilitate communication among a plurality of electronic circuits, wherein the first switch to transmit one or more flits of a particular signal packet to a second circuit responsive at least in part to obtaining one or more signals and/or states from the second circuit indicative of a vacancy in an input buffer of the second circuit;
processing, utilizing the processor of the computing device, the set of parameters representative of the electronic interconnect comprising the at least the first switch to generate a set of parameters representative of one or more feed-forward-type first-in first-out signal paths;
analyzing the set of parameters representative of one or more feed-forward-type first-in first-out signal paths to determine a delay bound parameter for the electronic interconnect; and
autonomously scheduling a particular task for a particular software agent based, at least in part, on the determined delay bound parameter.

2. The method of claim 1, wherein the determined delay bound parameter comprises a deterministic worst-case latency value for the electronic interconnect.

3. The method of claim 1, further comprising autonomously determining one or more parameters for an electronic system design based at least in part the determined delay bound parameter, wherein the electronic system design includes the plurality of electronic circuits and the electronic interconnect.

4. The method of claim 3, wherein the autonomously determining the one or more parameters for the electronic system design is further based, at least in part, on a specified quality of service for a particular use case.

5. The method of claim 1, wherein the autonomously scheduling the particular task for the particular software agent based, at least in part, on the determined delay bound parameter comprises planning a particular communication between particular electronic circuits of the plurality of electronic circuits.

6. The method of claim 1, wherein the autonomously scheduling the particular task for the particular software agent is further based, at least in part, on a specified quality of service parameter.

7. The method of claim 1, wherein the set of parameters representative of the electronic interconnect comprising the at least the first switch comprises parameters representative of flow control, link sharing or buffer sharing, or a combination thereof, for the at least the first switch.

8. The method of claim 7, wherein the processing the set of parameters representative of the electronic interconnect comprising the at least the first switch to generate the set of parameters representative of the one or more feed-forward-type first-in first-out signal paths includes processing the set of parameters representative of flow control, link sharing or buffer sharing, or the combination thereof, to generate the set of parameters representative of the one or more feed-forward-type first-in first-out signal paths.

9. The method of claim 8, wherein the processing the set of parameters representative of the flow control, link sharing or buffer sharing, or the combination thereof, is based at least in part on one or more parameters representative of one or more service curves for the at least the first switch.

10. An apparatus, comprising:
a plurality of electronic circuits;
an electronic interconnect to facilitate communication among the plurality of electronic circuits, wherein the electronic interconnect to comprise at least a first switch, wherein the first switch to transmit one or more flits of a particular signal packet to a second circuit responsive at least in part to receipt of one or more signals and/or states from the second circuit indicative of a vacancy in an input buffer of the second circuit; and
a processor to:
obtain a set of parameters representative of the electronic interconnect;
generate a set of parameters representative of one or more feed-forward first-in first-out signal paths based at least in part on the set of parameters representative of the electronic interconnect;
analyze the set of parameters representative of one or more feed-forward first-in first-out signal paths to determine a delay bound parameter for the electronic interconnect; and
autonomously schedule a particular task for a particular software agent based, at least in part, on the determined delay bound parameter.

11. The apparatus of claim 10, wherein the determined delay bound parameter to comprise a deterministic worst-case latency value for the electronic interconnect.

12. The apparatus of claim 10, wherein the processor further to autonomously determine one or more parameters for an electronic system design based at least in part the determined delay bound parameter, wherein the electronic system design to include the plurality of electronic circuits and the electronic interconnect.

13. The apparatus of claim 12, wherein the processor further to autonomously determine the one or more parameters for the electronic system design based, at least in part, on a specified quality of service for a particular use case.

14. The apparatus of claim 10, wherein, to autonomously schedule the particular task for the particular software agent based, at least in part, on the determined delay bound parameter, the processor to plan a particular communication between particular electronic circuits of the plurality of electronic circuits.

15. The apparatus of claim 10, wherein the processor to autonomously schedule the particular task for the particular software agent based, at least in part, on a specified quality of service parameter.

16. The apparatus of claim 10, wherein the set of parameters representative of the electronic interconnect to comprise the at least the first switch to comprise parameters representative of flow control, link sharing or buffer sharing, or a combination thereof, for the at least the first switch.

17. The apparatus of claim 16, wherein, to generate the set of parameters representative of the one or more feed-forward first-in first-out signal paths, the processor to process the parameters representative of flow control, link sharing or buffer sharing, or the combination thereof, for the at least the first switch to generate the set of parameters representative of the one or more feed-forward first-in first-out signal paths.

18. The apparatus of claim 17, wherein the processor to process the parameters representative of flow control, link sharing or buffer sharing, or the combination thereof, based at least in part on one or more parameters representative of one or more service curves for the at least the first switch.

* * * * *